United States Patent [19]

Weder et al.

[11] Patent Number: 5,509,188

[45] Date of Patent: *Apr. 23, 1996

[54] METHOD OF FORMING A FLOWER POT COVER WITH CRIMPED PORTION

[75] Inventors: Donald E. Weder, Highland; William F. Straeter, Breese, both of Ill.

[73] Assignee: Highland Supply Corporation, Highland, Ill.

[ * ] Notice: The term of this patent shall not extend beyond the expiration date of Pat. No. 5,361,482.

[21] Appl. No.: 306,558

[22] Filed: Sep. 15, 1994

Related U.S. Application Data

[63] Continuation of Ser. No. 940,930, Sep. 4, 1992, Pat. No. 5,361,482, and a continuation-in-part of Ser. No. 687,701, Apr. 18, 1991, abandoned, which is a continuation-in-part of Ser. No. 649,263, Jan. 30, 1991, abandoned, which is a continuation of Ser. No. 248,960, Sep. 26, 1988, abandoned, which is a continuation-in-part of Ser. No. 219,083, Jul. 13, 1988, Pat. No. 4,897,031, said Ser. No. 940,930, is a continuation-in-part of Ser. No. 926,098, Aug. 5, 1992, which is a continuation-in-part of Ser. No. 803,318, Dec. 4, 1991, Pat. No. 5,344,016, which is a continuation-in-part of Ser. No. 707,417, May 28, 1991, abandoned, which is a continuation of Ser. No. 502,358, Mar. 29, 1990, abandoned, which is a continuation-in-part of Ser. No. 391,463, Aug. 9, 1989, abandoned, which is a continuation-in-part of Ser. No. 249,761, Sep. 26, 1988, abandoned.

[51] Int. Cl.$^6$ .............................. B65B 25/14; B32B 3/30
[52] U.S. Cl. .............................. 29/469.5; 29/505; 47/72; 53/397; 229/87.19
[58] Field of Search .................. 29/469.5, 505, 29/525.1; 47/62, 66, 72; 53/397, 410, 412, 464; 156/226, 227; 229/87.01, 87.19

[56] References Cited

U.S. PATENT DOCUMENTS

| | | |
|---|---|---|
| 2,302,259 | 11/1942 | Rothfuss . |
| 2,621,142 | 12/1952 | Wetherell . |
| 2,648,487 | 8/1953 | Linda . |
| 3,376,666 | 4/1968 | Leonard ........................... 47/111 |
| 3,557,516 | 1/1971 | Brandt . |
| 4,733,521 | 3/1988 | Weder . |

(List continued on next page.)

FOREIGN PATENT DOCUMENTS

| | | |
|---|---|---|
| 1376047 | 9/1964 | France . |
| 1393725 | 2/1965 | France . |
| 2137325 | 12/1972 | France . |
| 2617796 | 4/1981 | France . |
| 2467796 | 4/1981 | France . |
| 8905250 | 10/1989 | Germany . |
| 1096058 | 12/1967 | United Kingdom . |
| 9003311 | 4/1990 | WIPO . |

OTHER PUBLICATIONS

"Color Them Happy With Highlander Products", ©1992, 2 pages.
"Super Seller, Supermarket Floral", Sep. 15, 1992.
"Costa Keeps The Christmas Spirit", Supermarket, Sep. 15, 1992.
"Now, More Than Ever", Supermarket Floral, Sep. 15, 1992.
"Halloween", Link Magazine, Sep. 1992, 2 pages.
Speed Cover® Brochure, "The Simple Solution . . . ", ©1989.
Speed Sheets and Speed Rolls Brochure, ©1990.

*Primary Examiner*—Peter Vo
*Assistant Examiner*—Khan V. Nguyen
*Attorney, Agent, or Firm*—Dunlap & Codding

[57] ABSTRACT

A flower pot cover consisting of a base and a skirt. The base has an upper end and a lower end with a pot opening being formed through the upper end of the base providing access to a pot receiving space. The skirt is connected to the upper end of the base and the skirt extends a distance outwardly from the base terminating with an outer periphery. A bonding material is disposed on the skirt or the base or both. A flower pot is disposed in the pot receiving space and the portion of the skirt and/or the base having the bonding material thereon is crimped to provide a crimped portion for cooperating to maintain the flower pot cover connected to the flower pot.

15 Claims, 2 Drawing Sheets

U.S. PATENT DOCUMENTS

| | | |
|---|---|---|
| 4,771,573 | 9/1988 | Stengel . |
| 4,773,182 | 9/1988 | Weder . |
| 4,801,014 | 1/1989 | Meadows ................................ 206/423 |
| 4,835,834 | 6/1989 | Weder . |
| 4,980,209 | 12/1990 | Hill . |
| 5,111,638 | 5/1992 | Weder . |
| 5,181,364 | 1/1993 | Weder . |

METHOD OF FORMING A FLOWER POT COVER WITH CRIMPED PORTION

RELATED REFERENCES

This Application is a continuation of U.S. Ser. No. 07/940,930 filed Sep. 4, 1992, now U.S. Pat. No. 5,361,482, which is a continuation-in-part of U.S. Ser. No. 07/926,098, filed Aug. 5, 1992, entitled "METHOD AND APPARATUS FOR FORMING A DECORATIVE COVER", which is a continuation-in-part of U.S. Ser. No. 803,318, filed Dec. 4, 1991, entitled "WRAPPING MATERIAL FOR WRAPPING A FLORAL GROUPING HAVING STAGGERED STRIPS OF ADHESIVE APPLIED THERETO AND METHOD", U.S. Pat. No. 5,394,016, which is a continuation-in-part of U.S. Ser. No. 707,417, filed May 28, 1991, now abandoned, entitled "WRAPPING A FLORAL GROUPING WITH SHEETS HAVING ADHESIVE OR COHESIVE MATERIAL APPLIED THERETO", which is a continuation of U.S. Ser. No. 502,358, filed Mar. 29, 1990, now abandoned, entitled "WRAPPING A FLORAL GROUPING WITH SHEETS HAVING ADHESIVE OR COHESIVE MATERIAL APPLIED THERETO", which is a continuation-in-part of U.S. Ser. No. 391,463, filed Aug. 9, 1989, now abandoned, entitled "ADHESIVE APPLICATOR," which is a continuation-in-part of U.S. Ser. No. 249,761, filed Sep. 26, 1988, now abandoned, entitled "METHOD FOR WRAPPING AN OBJECT IN A MATERIAL HAVING PRESSURE SENSITIVE ADHESIVE THEREON".

This Application is also a continuation-in-part of U.S. Ser. No. 07/687,701, filed Apr. 18, 1991, now abandoned, entitled, "WRAPPING MATERIAL HAVING A SHAPE SUSTAINING ELEMENT AND METHOD"; which is a CIP of Ser. No. 649,263, filed Jan. 30, 1991, now abandoned; which is a continuation of Ser. No. 248,960, filed Sep. 26, 1988, now abandoned; which is a CIP of Ser. No. 219,083, filed Jul. 13, 1988, now U.S. Pat. No. 4,897,031.

FIELD OF THE INVENTION

The present invention relates generally to flower pot covers for providing decorative coverings for flower pots and, more particularly, but not by way of limitation, to a flower pot cover having a bonding material thereon where the portion of the flower pot cover having the bonding material thereon is crimped to provide a crimped portion for cooperating to hold the flower pot cover disposed about the flower pot.

BRIEF DESCRIPTION OF THE DRAWINGS

FIG. 6 is a perspective view of yet another modified flower pot cover.

DESCRIPTION OF THE PREFERRED EMBODIMENTS

Figure 1:
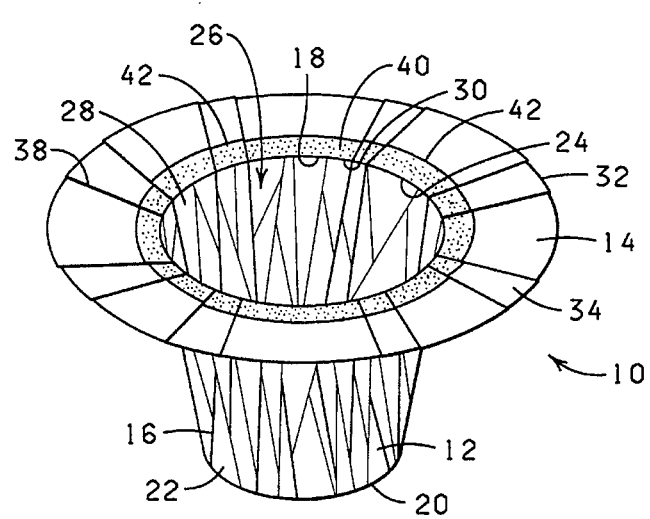
FIG. 1 is a perspective view of a flower pot cover constructed in accordance with the present invention.
Figure 2:
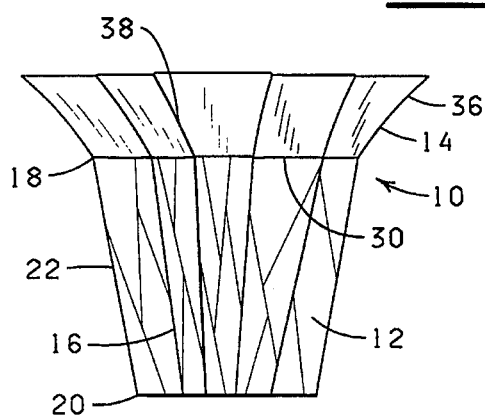
FIG. 2 is an elevational view of the flower pot cover of FIG. 1.

Shown in FIGS. 1 and 2 and designated therein by the general reference numeral 10 is a flower pot cover constructed in accordance with the present invention. The flower pot cover 10 comprises a base 12 and a skirt 14.

In one preferred form, the flower pot cover 10 is formed by taking a sheet of material and placing it between a male and a female mold. In this embodiment, the male mold is brought into mating engagement with the female mold thereby forming the flower pot cover 10. In this process, a plurality of overlapping folds 16 (FIGS. 1 and 2) are formed in the base 12. The overlapping folds 16 cooperate to maintain the structural integrity of the base 12 and cooperate to maintain the base 12 in the preformed shape. Apparatus and methods for forming a flower pot cover as just described are disclosed in detail in U.S. Pat. No. 4,773,182, titled "ARTICLE FORMING SYSTEM" issued Sep. 27, 1988 and assigned to the Assignee of the present invention and the disclosure of this Patent hereby specifically is incorporated herein by reference.

The base 12 has an upper end 18, a lower end 20 and an outer peripheral surface 22. A pot opening 24 (FIG. 1) is formed through the upper end 18 of the base 12 providing access to a pot receiving space 26 (FIG. 1). The pot receiving space 26 forms an inner peripheral surface in the base 12. As shown in FIGS. 1 and 2, the base 12 is generally cylindrically shaped, although the base 12 could be any geometric shape as may be desired in a particular application.

Figure 3:
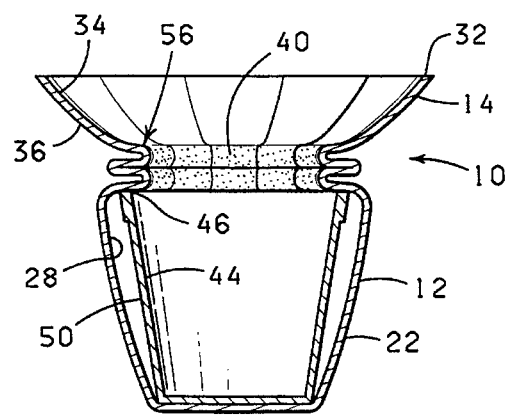
FIG. 3 is a sectional view of a flower pot with the flower pot cover of FIGS. 1 and 2 placed thereabout and with a crimped portion formed in the flower pot cover.

In a preferred manner, the skirt 14 is formed integrally with the base 12. The skirt 14 is connected to the upper end 18 of the base 12 at a connection 30 (FIG. 1) between the upper end 18 of the base 12 and the skirt 14. The skirt 14 extends a distance radially outwardly from the base 12 terminating with an outer periphery 32 (FIGS. 1 and 3). The skirt 14 has an inner peripheral face 34 (FIGS. 1 and 3) and an outer peripheral surface 36 (FIGS. 2 and 3). In one form, shown in FIGS. 1 and 2, a plurality of folds 38 also are formed in the skirt 14 with most of the folds 38 extending radially outwardly from the upper end 18 of the base 12 toward the outer periphery 32 of the skirt 14.

The base 12 and the skirt 14 may be constructed of any suitable material that is capable of being formed into the flower pot cover 10.

Preferably, the material from which the flower pot cover 10 is constructed is a material selected from a group of materials consisting of paper, metal foil, cloth (natural or synthetic), denim, burlap or polymer film or combinations thereof.

The term "polymer film" as used herein means any polymer film. For example, but not by way of limitation, one polymer film is a polypropylene film. Another example of a polymer film, but not by way of limitation, is cellophane.

The material has a thickness in a range from about 0.1 mils to about 30 mils. Preferably, the material has a thickness in a range from about 0.1 mils to about 5 mils.

The material may be any geometric shape. The material may be constructed of a single layer of material or a plurality of layers of the same or different types of materials. Any thickness of the material or, in other words, the flower pot cover 10 may be utilized in accordance with the present invention as long as the material is formable into the flower pot cover 10 in some manner. The layers of material comprising the flower pot cover 10 may be connected together or laminated or may be separate layers.

A decorative pattern, such as a color and/or an embossed pattern, and/or other decorative surface ornamentation may be applied to the inner peripheral surfaces 28 and 34 and/or the outer peripheral surfaces 22 and 36 of the flower pot cover 10 or portions thereof including, but not limited to printed design, coatings, colors, flocking or metallic finishes. The sheet of material also may be totally or partially clear or tinted transparent material.

A bonding material 40 (FIG. 1) is disposed on a portion of the inner peripheral surface 34 of the skirt 14. The bonding material 40 more particularly is disposed near the connection 30 between the skirt 14 and the upper end 18 of the base 12. The bonding material 40 covers an area extending from the connection 30 of the skirt 14 to the upper end 18 of the base 12 a distance radially outwardly to a line 42 (FIG. 1) spaced a distance radially outwardly from the connection 30. Although the bonding material 40 is shown in FIGS. 1 and 2 in the form of a continuous strip of the bonding material 40, the bonding material 40 may be in the form of spots or spaced apart strips or any other form desired in a particular application suitable for effecting the crimping described below.

The term "bonding material" as used herein means an adhesive, preferably a pressure sensitive adhesive or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the flower pot cover 10 and, in this instance, heat also must be applied to effect the sealing. The term "bonding material" as used herein means any type of material or thing which can be used to effect the bonding or connecting of the two adjacent portions of the flower pot cover 10 to effect the connection or bonding described herein. The term "bonding material" also includes labels, bands, ribbons, strings, tape, staples or combinations thereof.

As mentioned before, the bonding material 40 preferably is an adhesive or cohesive. More particularly, the bonding material 40 preferably is a cohesive. When the bonding material 40 is a cohesive, a plurality of the flower pot covers 10 may be stacked one on top of the other with the base 12 of an adjacent flower pot cover being disposed in the pot receiving space 26 of an adjacent flower pot cover 10. When the bonding material 40 is a cohesive, the bonding material 40 will not cause one flower pot cover 10 to be bonded to an adjacent flower pot cover 10 when the flower pot covers 10 are stacked in the manner just described.

The bonding material 40 may be applied to the sheet of material prior to forming the sheet of material into the flower pot cover 10 or the bonding material 40 may be applied during the forming of the sheet of material into the flower pot cover 10 or the bonding material 40 may be applied after the flower pot cover 10 has been formed.

As mentioned before, the flower pot cover 10 is adapted and configured to be used with a flower pot, a flower pot being shown in FIG. 3 and designated therein by the referenced numeral 44. As shown in FIG. 3, the flower pot 44 has an upper end 46, a lower end 48, an outer peripheral surface 50 with an opening 52 being formed through the upper end 46 of the flower pot 44 providing access to a plant or flower receiving space 54.

In use, the lower end 48 of the flower pot 44 is disposed through the pot opening 24 and into the pot receiving space 26 of the flower pot cover 10 to a position wherein the lower end 48 of the flower pot 44 is disposed near the lower end 20 of the flower pot cover 10 and the upper end 46 of the flower pot 44 is disposed near the upper end 18 of the flower pot cover 10.

After the flower pot 44 has been disposed in the pot receiving space 26, a crimped portion 56 (FIG. 3) is formed in the skirt 14 by bringing together adjacent portions of the skirt 14 about the bonding material 40 thereby causing the adjacent portions to be bonded together for forming the crimped portion 56. The crimping of the skirt 14 may be accomplished by hand or with a device or machine as may be desired in a particular application.

The crimped portion 56 extends a distance radially inwardly above the upper end 46 of the flower pot 44. The crimped portion 56 is disposed about adjacent the upper end 46 of the flower pot 44 and the crimped portion 56 engages a portion of the upper end 46 of the flower pot 44 for cooperating to maintain the flower pot cover 10 assembled around or connected to the flower pot 44.

The crimped portion 56 preferably extends circumferentially about the upper end 18 of the flower pot cover 10 and preferably circumferentially around the upper end 46 of the flower pot 44. In some applications, it may be desirable to form the crimped portion 56 only at certain positions spaced circumferentially about the upper end 18 of the base 12.

The flower pot cover 10 substantially encompasses the flower pot 44 when the flower pot 44 is disposed in the pot receiving space 26.

EMBODIMENT OF FIGS. 4 AND 5

Figure 4:
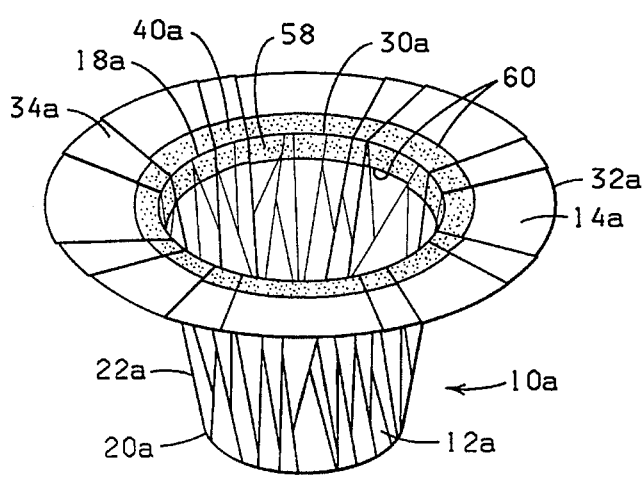
FIG. 4 is a perspective view of a modified flower pot cover constructed in accordance with the present invention.
Figure 5:
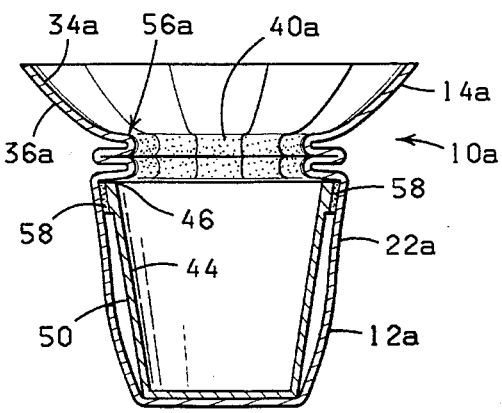
FIG. 5 is a sectional view showing the flower pot cover of FIG. 4 placed about a flower pot with the flower pot cover having a crimped portion formed therein.
Figure 5:
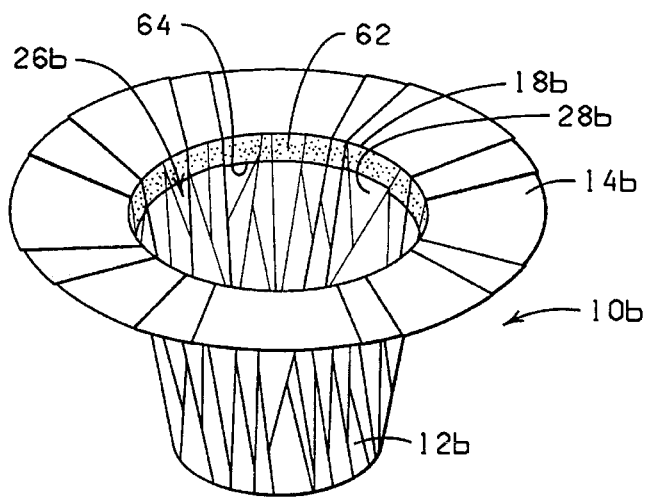

Shown in FIGS. 4 and 5 is a modified flower pot cover 10*a* which is constructed exactly like the flower pot cover 10 shown in FIGS. 1, 2 and 3 and described in detail before, except the flower pot cover 10*a* also includes a bonding material 58 disposed on the inner peripheral surface 28 of the base 12 near the upper end 18 of the base 12 in addition to the bonding material 40*a* disposed on the inner peripheral surface 34*a* of the skirt 14*a*.

The bonding material 58*a* extends from the upper end 18 of the base 12 a distance toward the lower end 20 of the base 12 to a line 60 disposed near and spaced a distance from the upper end 18 of the base 12. The bonding material 58 extends circumferentially about the upper end 18 of the base 12. The bonding material 58 substantially covers the entire area between the upper end 18 of the base 12 and the line 60. It should be noted that the bonding material 58, although shown as a continuous strip in FIG. 4, could be spots or spaced apart strips if desired in a particular application.

In operation, as illustrated in FIG. 5, the flower pot cover 10*a* is disposed about the flower pot 44 in the manner described before in connection with the flower pot 10 shown in FIGS. 1, 2 and 3, and the crimped portion 56*a* is formed in the flower pot cover 10*a* in a manner exactly like that described before in connection with the flower pot cover 10 and the crimped portion 56 shown in FIG. 3. In addition, the bonding material 58 on the inner peripheral surface 28a of the base 12a bondingly engages to a portion of the outer peripheral surface 50 of the flower pot 44 near the upper end 46 of the flower pot 44. The bonding engagement between the bonding material 58 and the flower pot 44 further cooperates to secure the flower pot cover 10a to the flower pot 44.

In those instances where the bonding material 58a is a cohesive, a cohesive material also is included on the outer peripheral surface 50 of the flower pot 44 for bondingly engaging with the bonding material 58 on the flower pot cover 10a.

EMBODIMENT OF FIG. 6

Shown in FIG. 6 is another modified flower pot cover 10b which is constructed exactly like the flower pot cover 10 shown in FIGS. 1 and 2, except the flower pot cover 10b does not include bonding material on the skirt 14b like the bonding material 40 on the skirt 14 shown in FIGS. 1 and 2. Rather, the flower pot cover 10b includes bonding material 62 disposed on the inner peripheral surface 28b of the flower pot cover 10b near the upper end 18b of the base 12b. The bonding material 62 extends circumferentially about the upper end 18b of the base 12b. The bonding material 62 extends from the upper end 18b to a line 64 spaced a distance from the upper end 18b of the base 12b. The bonding material 62 substantially covers the entire area between the upper end 18b and the lines 64. The bonding material 62 could be in the form of spots or spaced apart strips if desired in a particular application.

Figures 7, 8:
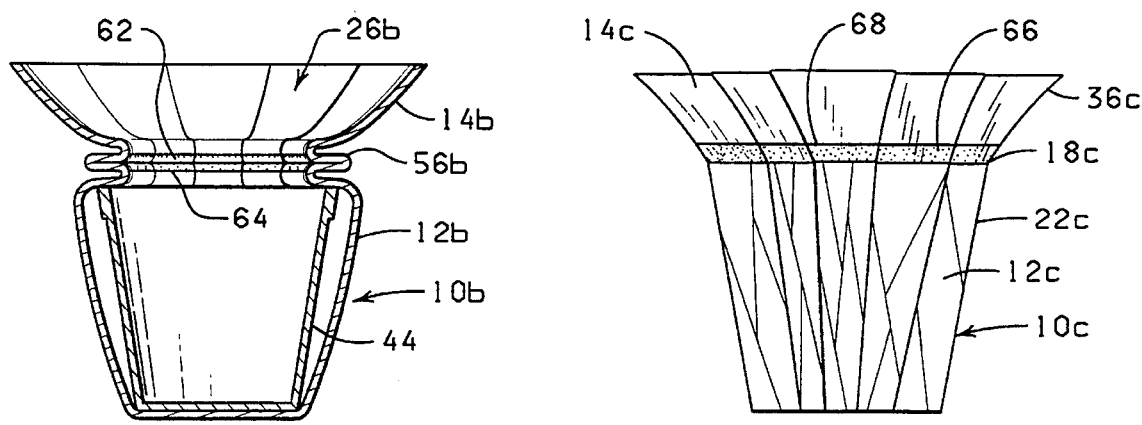
FIG. 7 is a sectional view showing the flower pot cover of FIG. 6 disposed about a flower pot with a crimped portion being formed in the flower pot cover.
FIG. 8 is an elevational view of still another modified flower pot cover.

In use, the flower pot 44 is disposed in the pot receiving space 26b of the flower pot cover 10b, as shown in FIG. 7. The crimped portion 56b is formed in the flower pot cover 10b by crimping together portions of the flower pot cover 10b near the bonding material 62 with the bonding material 62 cooperating to bond the overlapping crimped portions for maintaining the shape of the crimped portion 56b in a manner like that described before. In this application, the crimped portion 56b is formed in the base 12b, rather than in the skirt 14b as is the case in connection with the flower pot cover 10 shown in FIGS. 1, 2 and 3.

EMBODIMENT OF FIG. 8

Shown in FIG. 8 is another modified flower pot cover 10c which is constructed exactly like the flower pot cover 10 shown in FIGS. 1 and 2 and described in detail before, except the flower pot cover 10c includes bonding material 66 on the outer peripheral surface 36c of the skirt 14c near the upper end 18c of the base 12c. The bonding material 66 extends circumferentially above the upper end 18c of the base 12c. The bonding material 66 extends, on the skirt 14c from the upper end 18c of the base 12c to a line 68 spaced a distance from the upper end 18c of the base 12c.

In use, the flower pot cover 10c is disposed about a flower pot 44 and the crimped portion is formed by crimping together portions of the flower pot cover near and adjacent the bonding material 66 to form the crimped portion in a manner like that described before in connection with the flower pot cover 10 shown in FIG. 1, except the bonding material 66 is on the outer peripheral surface 36c of the skirt 14c, rather than the inner peripheral surface as is the case with the flower pot cover 10 shown in FIG. 1.

EMBODIMENT OF FIG. 9

Figure 9:
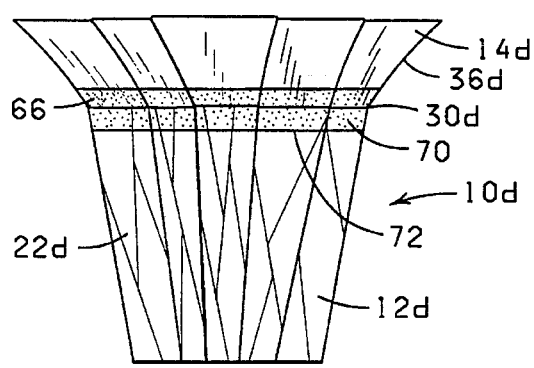
FIG. 9 is an elevational view of still another modified flower pot cover.

Shown in FIG. 9 is a flower pot cover 10d which is constructed exactly like the flower pot cover 10c shown in FIG. 8 described in detail before, except the flower pot cover 10d also includes bonding material 70 on the outer peripheral surface 22d of the base 12d near the connection 30d. In this instance, the crimped portion is formed by crimping together portions of the base 12d and the skirt 14d having the bonding materials 70 and 66 respectively thereon.

EMBODIMENT OF FIG. 10

Figure 10:
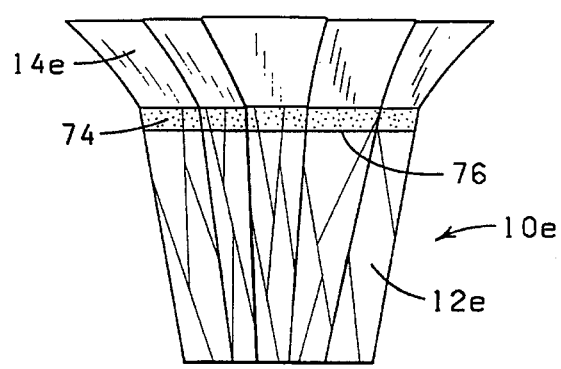
FIG. 10 is an elevational view of still another modified flower pot cover.

Shown in FIG. 10 is another modified flower pot cover 10e which is constructed exactly like the flower pot cover 10e, except the flower pot cover 10e does not include the bonding material 66 on the skirt. Rather, the flower pot cover 10e includes only a bonding material 74 on the base 12e which extends to a line 76. The flower pot cover 10e will operate to form the crimped portion in a manner exactly like that described before with respect to the flower pot covers 10c and 10d shown in FIGS. 8 and 9, except the crimped portion only will be formed by crimping together portions of the bonding material 74 on the base 12e.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for covering a flower pot comprising:

providing a preformed flower pot cover, the flower pot cover having a base having an upper end, a lower end, an outer peripheral surface and a pot opening formed through the upper end of the base providing access to a pot receiving space, the pot receiving space forming an inner peripheral surface in the base, a bonding material being disposed on the base;

providing a flower pot having an upper end, a lower end and an outer peripheral surface;

disposing the flower pot in the pot receiving space of the base;

forming a crimped portion in the base by crimping together portions of the base with the bonding material thereon wherein the bonding material causes the portions of the base which are crimped together to be bonded together, the crimped portion cooperating to hold the base on the flower pot thereby forming a decorative cover about the flower pot.

2. The method of claim 1 wherein the step of forming the crimped portion is defined further as forming the crimped portion in the base at a position above the upper end of the flower pot.

3. The method of claim 1 wherein the step of forming the crimped portion is defined further as forming the crimped portion extending circumferentially about the base.

4. The method of claim 1 wherein in the step of providing the preformed flower pot cover, the base is defined further as having the bonding material disposed on the inner peripheral surface thereof.

5. The method of claim 1 wherein in the step of providing the preformed flower pot cover, the base is defined further as having the bonding material disposed on the outer peripheral surface thereof.

6. A method for providing a flower pot cover disposable about a flower pot, comprising:

providing a preformed base having an upper end, a lower end, an outer peripheral surface and a pot opening formed through the upper end of the base providing access to a pot receiving space, the pot receiving space forming an inner peripheral surface in the base, and a skirt connected to the upper end of the base, the skirt extending a distance from the upper end of the base terminating with an outer periphery, the skirt having an outer peripheral surface and an inner peripheral surface, a bonding material being disposed on a portion of the skirt;

providing a flower pot having an upper end and a lower end;

disposing the flower pot in the pot receiving space of the preformed base; and crimping together portions of the skirt having the bonding material thereon wherein the bonding material causes the portions of the skirt which are crimped together to be bonded together forming a crimped portion, the crimped portion cooperating to hold the flower pot cover on the flower pot.

7. The method of claim 6 wherein the step of forming the crimped portion is defined further as forming the crimped portion extending circumferentially about the cover.

8. The method of claim 6 wherein the step of providing the preformed base is defined further as providing the preformed base with the skirt connected thereto and with the bonding material being disposed on the inner peripheral surface of the skirt.

9. The method of claim 6 wherein the step of providing the base is defined further as providing the base with the skirt connected thereto and with the bonding material being disposed on the outer peripheral surface of the skirt.

10. The method of claim 6 wherein the step of forming the crimped portion is defined further as forming the crimped portion extending a distance radially inwardly above the upper end of the flower pot.

11. A method for providing a flower pot cover for a flower pot having an upper end, a lower end, and an outer peripheral surface, comprising:

providing a preformed flower pot cover, the flower pot cover having a base having an upper end, a lower end, an outer peripheral surface and a pot opening formed through the upper end of the base providing access to a pot receiving space, the pot receiving space forming an inner peripheral surface in the base, a bonding material being disposed on the base;

forming a crimped portion in the base by crimping together portions of the base with the bonding material thereon wherein the bonding material causes the portions of the base which are crimped together to be bonded together; and disposing a flower pot in the pot receiving space of the base wherein the crimped portion holds the base onto the flower pot.

12. The method of claim 11 wherein the step of forming the crimped portion is defined further as forming the crimped portion such that the crimped portion extends circumferentially about the base.

13. A method for providing a flower pot cover disposable about a flower pot having an upper end and a lower end, comprising:

providing a preformed base having an upper end, a lower end, an outer peripheral surface and a pot opening formed through the upper end of the base providing access to a pot receiving space, the pot receiving space forming an inner peripheral surface in the base, and a skirt connected to the upper end of the base, the skirt extending a distance from the upper end of the base terminating with an outer periphery, the skirt having an outer peripheral surface and an inner peripheral surface, a bonding material being disposed on a portion of the skirt;

crimping together portions of the skirt having the bonding material thereon wherein the bonding material causes the portions of the skirt which are crimped together to be bonded together forming a crimped portion; and disposing a flower pot in the pot receiving space of the base wherein the crimped portion holds the cover onto the flower pot.

14. The method of claim 13 wherein the step of forming the crimped portion is defined further as forming the crimped portion extending circumferentially about the cover.

15. The method of claim 13 wherein the step of providing the preformed base is defined further as providing the preformed base with the skirt connected thereto and with the bonding material being disposed on the inner peripheral surface of the skirt.

* * * * *

UNITED STATES PATENT AND TRADEMARK OFFICE
CERTIFICATE OF CORRECTION

PATENT NO. : 5,509,188

DATED : April 23, 1996

INVENTOR(S) : Weder et al.

It is certified that error appears in the above-identified patent and that said Letters Patent is hereby corrected as shown below:

In the drawings, please add the reference numerals --48--, --52-- and --54-- to Figure 3 as indicated below.

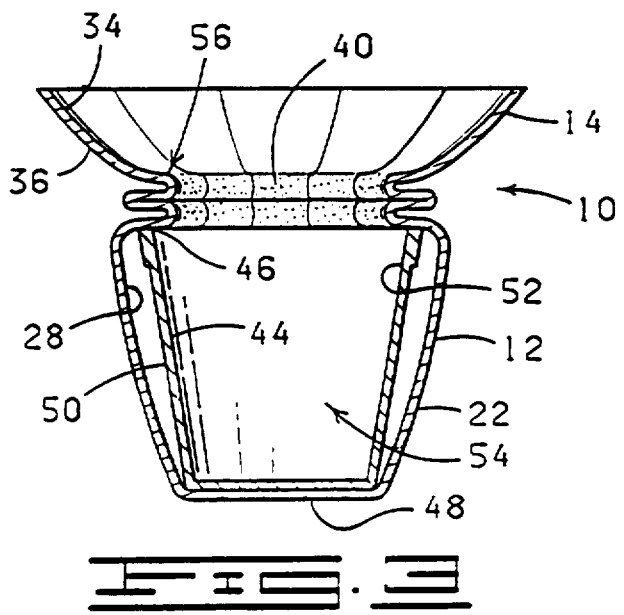

FIG. 3

UNITED STATES PATENT AND TRADEMARK OFFICE
CERTIFICATE OF CORRECTION

PATENT NO.  : 5,509,188
DATED       : April 23, 1996
INVENTOR(S) : Weder et al.

It is certified that error appears in the above-identified patent and that said Letters Patent is hereby corrected as shown below:

In the drawings, please add the reference numeral --28a-- to Figure 5 as indicated below.

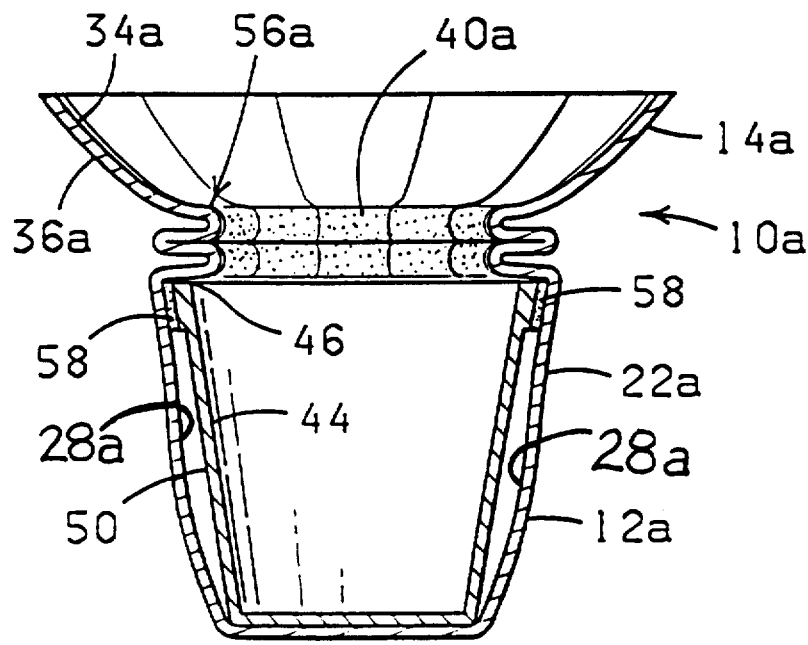

UNITED STATES PATENT AND TRADEMARK OFFICE
CERTIFICATE OF CORRECTION

PATENT NO. : 5,509,188

DATED : April 23, 1996

INVENTOR(S) : Weder et al.

It is certified that error appears in the above-identified patent and that said Letters Patent is hereby corrected as shown below:

Column 1, line 15, please delete "5,394,016" and substitute therefor --5,344,016--.

Column 2, line 46, please delete "face 34" and substitute therefor --surface 34--.

Column 4, line 48, please delete "28" and substitute therefor --28a--.

Column 4, line 49, please delete both occurrences of "base 12" and substitute therefor --base 12a--.

Column 4, line 49, please delete "upper end 18" and substitute therefor --upper end 18a--.

Column 4, line 52, please delete "material 58a" and substitute therefor --material 58--.

Column 4, line 52, please delete "upper end 18" and substitute therefor --upper end 18a--.

Column 4, line 53, please delete "base 12" and substitute therefor --base 12a--.

Column 4, line 53, please delete "lower end 20" and substitute therefor --lower end 20a--.

UNITED STATES PATENT AND TRADEMARK OFFICE
CERTIFICATE OF CORRECTION

PATENT NO. : 5,509,188

DATED : April 23, 1996

INVENTOR(S) : Weder et al.

It is certified that error appears in the above-identified patent and that said Letters Patent is hereby corrected as shown below:

Column 4, lines 53 and 54, please delete "base 12" and substitute therefor --base 12a--.

Column 4, line 55, please delete "upper end 18" and substitute therefor --upper end 18a--.

Column 4, line 55, please delete "base 12" and substitute therefor --base 12a--.

Column 4, line 56, please delete "upper end 18" and substitute therefor --upper end 18a--.

Column 4, lines 56 and 57, please delete "base 12" and substitute therefor --base 12a--.

Column 4, line 58, please delete "upper end 18" and substitute therefor --upper end 18a--.

Column 4, line 58, please delete "base 12" and substitute therefor --base 12a--.

Column 5, line 2, please delete "surface 28a" and substitute therefor --surface 28--.

Column 5, line 9, please delete "material 58a" and substitute therefor --material 58--.

Column 5, line 56, after "extends" please delete ",".

UNITED STATES PATENT AND TRADEMARK OFFICE
CERTIFICATE OF CORRECTION

PATENT NO. : 5,509,188
DATED : April 23, 1996
INVENTOR(S) : Weder et al.

It is certified that error appears in the above-indentified patent and that said Letters Patent is hereby corrected as shown below:

Column 6, lines 14 and 15, delete "flower pot cover 10e" and substitute therefor --flower pot cover 10d--.

Signed and Sealed this

Thirteenth Day of August, 1996

Attest:

BRUCE LEHMAN

Attesting Officer    Commissioner of Patents and Trademarks